March 26, 1968  J. R. STUTELY ET AL  3,374,743

PUMPS

Filed Aug. 24, 1966  7 Sheets-Sheet 1

INVENTORS
JOHN RICHARD STUTELY
ANTHONY JOHN WALKDEN

ATTORNEYS

United States Patent Office 3,374,743
Patented Mar. 26, 1968

3,374,743
PUMPS
John Richard Stutely, Ruislip Manor, and Anthony John Walkden, Beckenham, England, assignors to The General Electric Company Limited, London, England, a British company
Filed Aug. 24, 1966, Ser. No. 574,758
Claims priority, application Great Britain, Sept. 2, 1965, 37,530/65
16 Claims. (Cl. 103—1)

ABSTRACT OF THE DISCLOSURE

A pump especially suitable for use with corrosive fluids has a fluid-filled pump channel with side passages extending from points spaced along the channel length, each of which passages is partly filled with the fluid the amount of which lying within the passage is caused to pulsate by means entirely external of the channel, the passage inlets being directed along the channel length and the pulsations between the passages being so phased as to induce a net forward flow of the fluid. A liquid can be pumped by variations in the gas pressure applied over the liquid level within the passages, and the passages and passage inlets can be arranged so that for each passage the suck strokes as well as the blow strokes induce a forward flow of the liquid.

---

Figure 1:
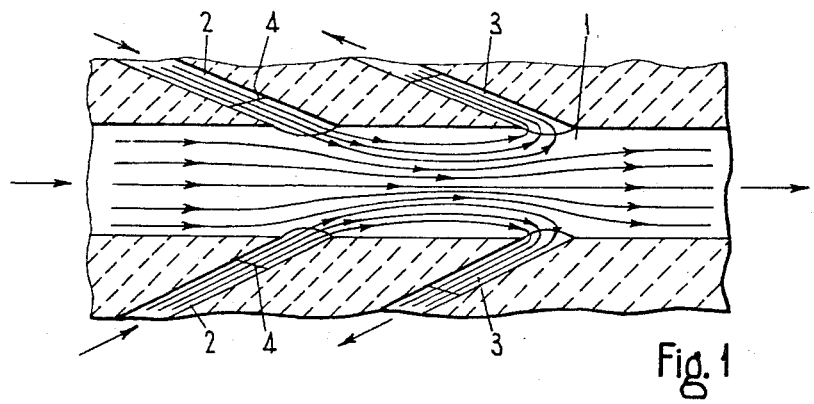

This invention relates to a form of pump for the pumping of fluids and more particularly, but not exclusively, for the pumping of high temperature and/or corrosive fluids.

Conventional pumps such as those relying on the direct pumping action of pistons or turbine blades in contact with the fluid being pumped have the disadvantage in the handling of high temperature and/or corrosive fluids of severe corrosion together with the possible melting of parts and may even prove impossible to use for the pumping of some fluids of this nature.

It is an object of the present invention to provide a pump which can be designed to be more suitable for use with at least some fluids of this nature.

According to the invention, a pump for fluids comprises a channel from which there project a plurality of passages spaced in succession along the length of the channel, the channel extending from a first region to a second region and the passages being connected to means for effecting pulsations of fluid along the passages when, in use of the pump, the channel is filled with fluid which extends into the passages, said means being arranged to so phase the pulsations between the various passages, and the passage inlets being so directed along the length of the channel, as to induce a net forward flow of fluid along the channel from said first to said second region when these regions are respectively at low and high pressures.

A pump in accordance with the invention can be so constructed that the pulsations of fluid along the passages are produced by variations in the pressure of a gas or liquid linkage such that there are no mechanical moving parts such as pistons or turbine blades which might be liable to corrosion or melting directly in contact with the fluid being pumped.

A pump in accordance with the invention can be so designed that there is a net forward flow of fluid induced along the channel during both the suck and the blow strokes of the pulsations in any passage.

In one form of the invention the channel is of approximately cylindrical shape and the passages are in the form of tubes extending from the walls of the channel and inclined backwards with respect to the direction of flow of the fluid.

In another form of the invention the channel is of the form of a series of venturi parts and the passages extend as tubes through the walls to the centre of the channel and within the channel are bent in such a way that their nozzles point along the axis of the channel in the desired direction of pumping.

In a particular type of this last form for pumping liquids downwards across high pressure gradients the said channel is vertical and two passages project into each venturi, one on opposite sides.

In yet another form of the invention the channel is vertical and each passage of said channel is approximately funnel-shaped, the aperture of each passage where it joins the channel extending round the circumference of the channel.

In a pump of the last mentioned kind arranged for pumping liquids downwards the passage funnels point downwards, the pressure responsive medium is a gas and the surfaces of each funnel passage are preferably ridged internally in spirals about the axis of the central channel in such manner as to cause the liquid in each passage on a blow stroke to swirl into a vortex motion within the passage and thereby upon ejection, by virtue of the centrifugal force acquired, to be flung outwards and down the channel rather than upwards.

Additional features which may be incorporated in said last mentioned kind of pump in order to enable the pumping of liquids upwards to be effected is the provision of funnel passages each of which is upwardly pointing adjacent the channel but bent back upwardly upon itself to provide a bend at the bottom communicating between downward and upward funneled passage portions and drive means so adapted as to effect pulsations in which the pressure responsive medium fluid interfaces oscillate wholly within the downward portions of the passages so that no pressure responsive medium is blown out into the central channel and so lost.

In a pump of said last mentioned kind and with said spirals it is preferable for the spiralling within each funnel passage to be of the opposite clockwise sense to those in the passages immediately above and below it, thereby promoting, by angular momentum coupling, more efficient transfer of fluid out of one passage on a blow stroke and into the next in the desired direction of pumping.

In a pump of said last mentioned kind for pumping liquids the axis of each passage and the axis of the central channel in the direction of pumping are preferably inclined acutely and the edge of the nozzle therebetween in these said directions is sharp so that on a suck stroke the non-reciprocity of flow of a liquid forced around a sharp bend is utilized and liquid drawn into each said passage is effectively lodged there until the coming of the next blow stroke when optimum force of blow-out will be achieved.

The materials of which the walls of the channel and the passages are constructed or with which they are lined must of course be sufficiently refractory and chemically resistant to the fluid being pumped as not to deteriorate unduly rapidly in use.

The modus operandi of any of the above kinds of pump in accordance with the invention resides in the completely different flow patterns which arise during the blow and the suck phases of a cycle or pulsation. This results in a net transfer of momentum in the direction towards which the jet orifice of each passage is pointed. During a blow stroke a jet orifice acts as a source of directed momentum, resulting in a vector "jet flow" pattern. During a suck stroke a jet orifice acts as a sink which extracts the same mass of fluid as had been injected into the central channel in its previous blow stroke. A scalar "potential flow" pattern is formed so that the extracted fluid contains little directed momentum until it re-enters the jet orifice.

Considered in terms of energy it may be seen that during a blow stroke gas pressure energy or mechanical energy is converted initially into kinetic energy of fluid within each passage. This is vectored into the central channel where momentum mixing occurs with an unavoidable energy loss to produce an increase in fluid pressure energy. (A venturi reduces this mixing loss.) A small amount of pressure energy is lost during a suck stroke.

Consideration of the Euler momentum theorem combined with an impulse treatment, gives the following expression for the mean head developed by the pump:

$$h_\mathrm{D} = \frac{nK\langle\hat{\nu}_\mathrm{JD}\rangle}{g}[1+\frac{\alpha}{2}-\hat{\nu}_\mathrm{T}/\hat{\nu}_\mathrm{JB}]$$

where $n$ is number of jets
$K$ is the time fraction of blow during one cycle
$\alpha \lesssim 1$ is the ratio of jet area to tube or venturi area
$\hat{\nu}_\mathrm{JD}$ is the root mean square jet velocity during blow
$\hat{\nu}_\mathrm{JB}$ is the mean jet velocity during blow
$\nu_\mathrm{T}$ is the mean flow velocity of the main throughput in the mixing region
$g$ is the acceleration due to gravity One use for pumps in accordance with the invention which is particularly envisaged is the pumping of hot molten slag-seed mixture in a combined heat exchanger and seed recoverer of magneto-hydrodynamic generator plant.

Pumps in accordance with the invention might however also find use, for example, for the pumping of molten metal or other materials, for example in the glass and metal industries, or for the pumping of highly corrosive liquids and/or gases in the chemical industry, or for the pumping of blood in surgical operations since these pumps lack such mechanical moving parts as valves opening and shutting or pistons scraping against cylinder walls which would be damaging to the blood corpuscles.

Figure 2:
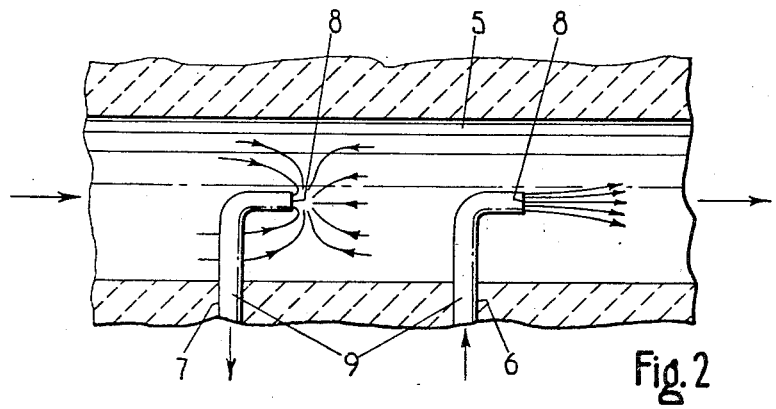
Figure 3:
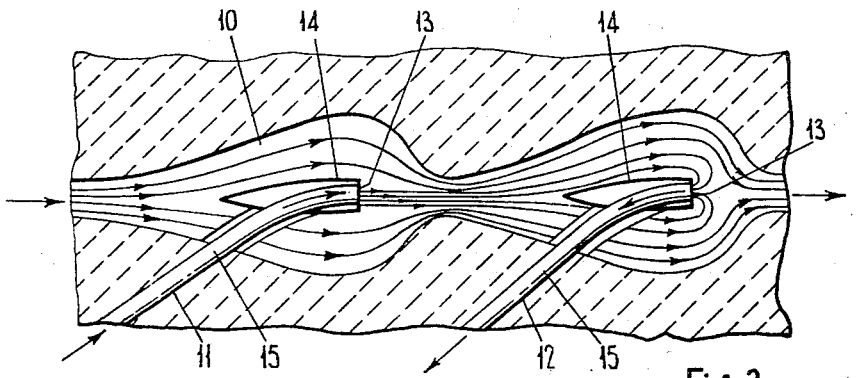
Figure 4:
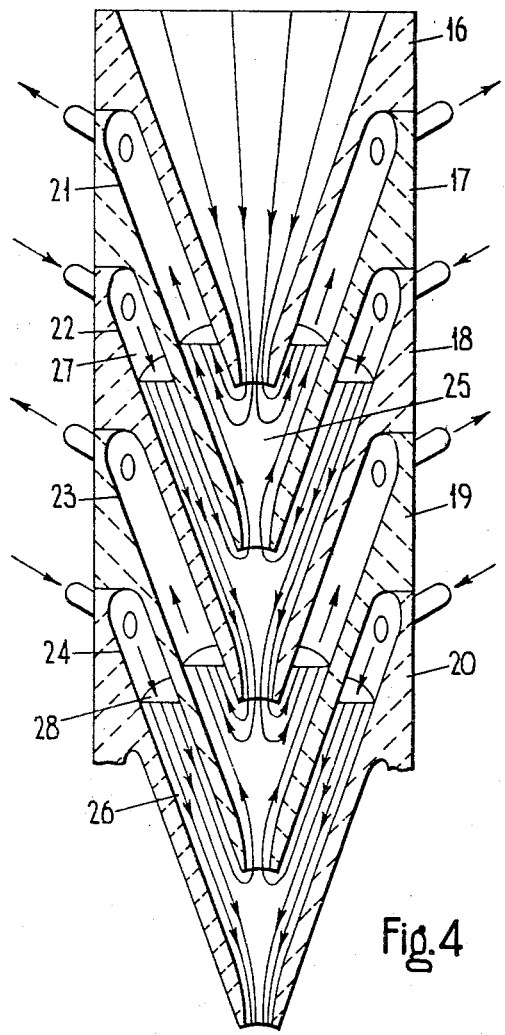
Figure 5:
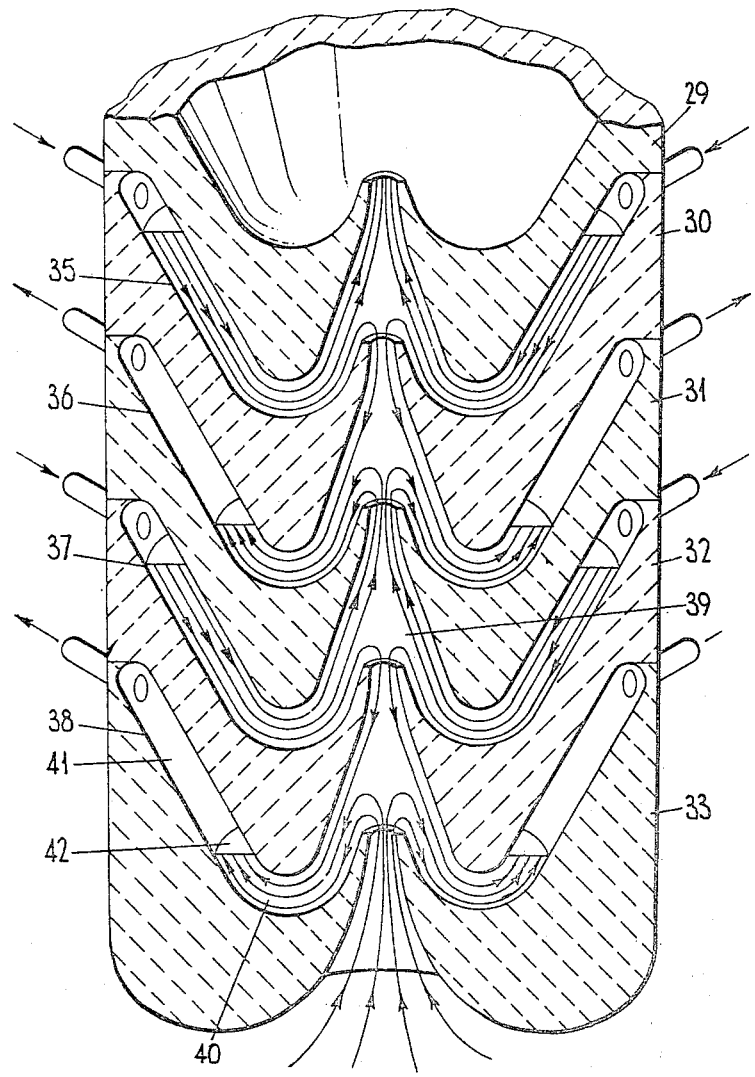
Figure 6:
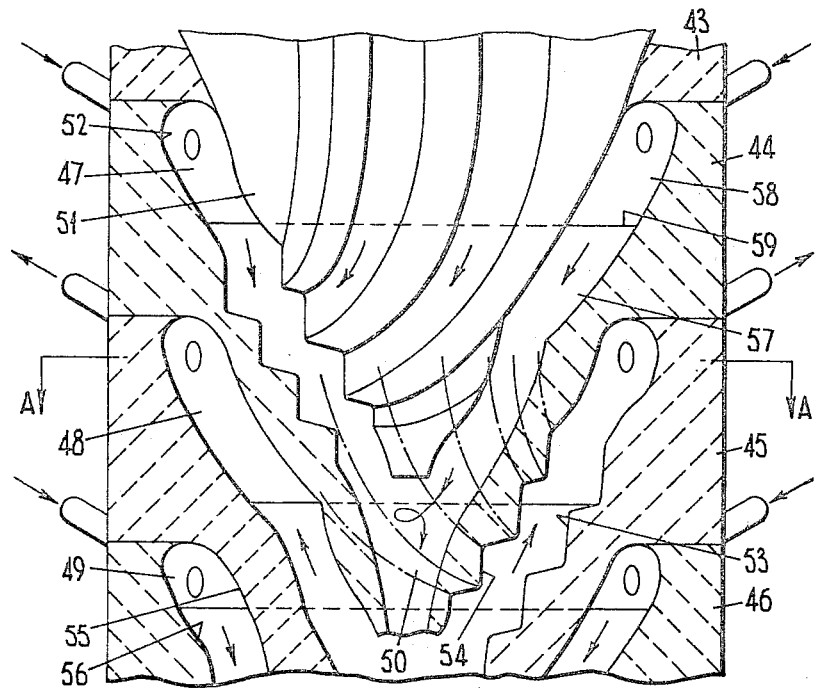
Figure 7:
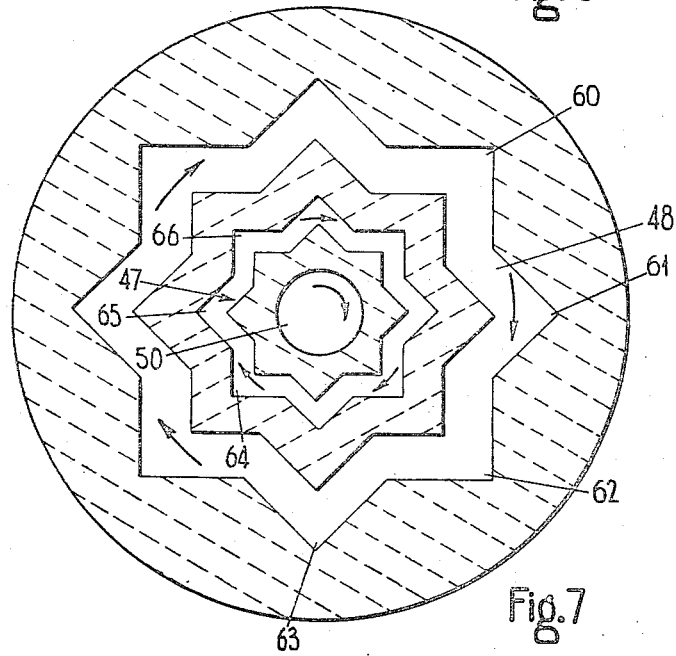
Figure 8:
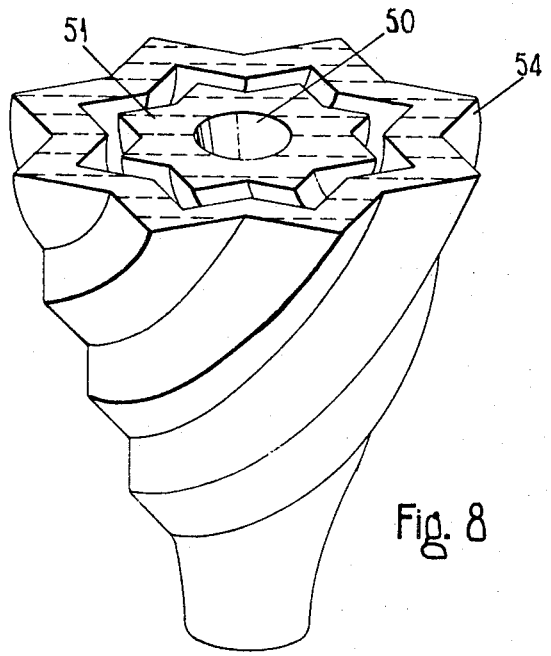
Figure 9:
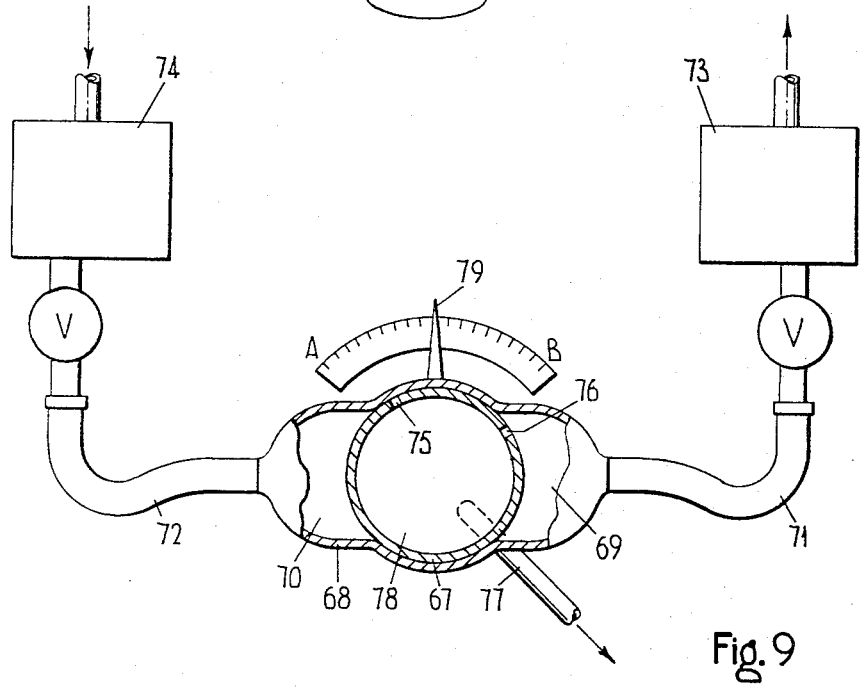
Figure 10:
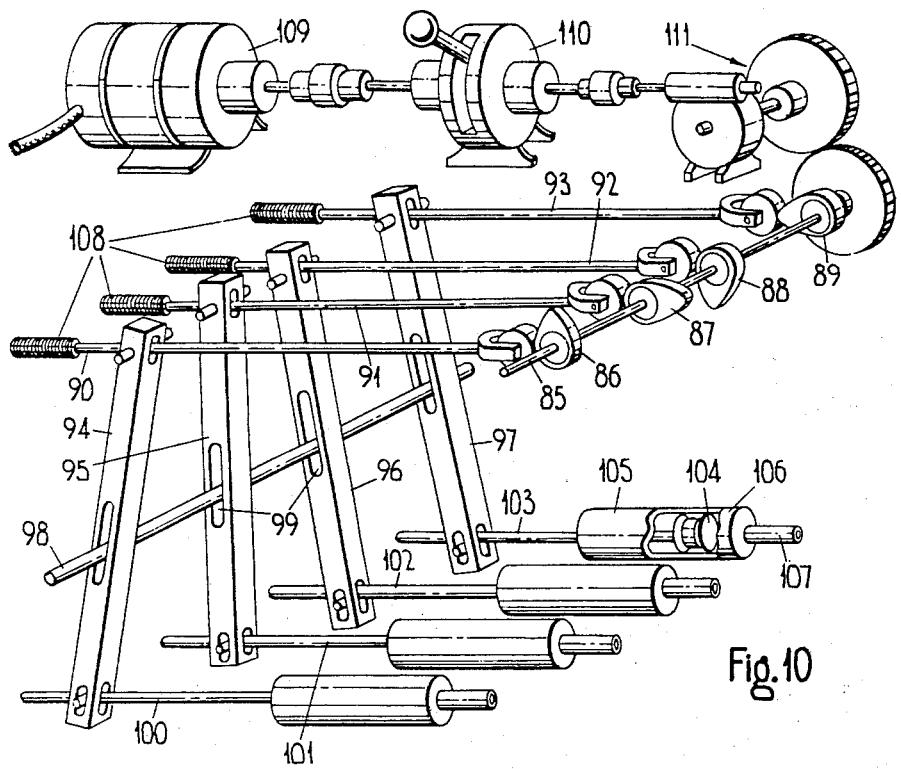
Figure 11:
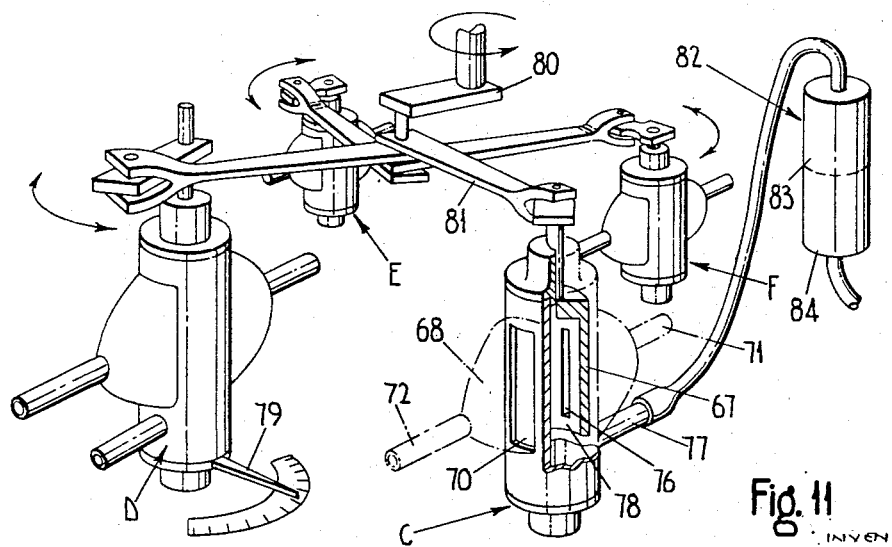

Several arrangements in accordance with the present invention will now be described, by way of example, with reference to the accompanying drawings, in which:

FIGURE 1 is a sectional side view of part of a pump according to the invention for pumping liquid at a high rate of flow, FIGURE 2 is a sectional side view of part of a further pump according to the invention for pumping liquid, FIGURE 3 is a sectional side view of part of another pump according to the invention designed for pumping liquid across high pressure gradients, FIGURE 4 is a perspective section of part of another pump according to the invention designed for pumping liquid downwards, FIGURE 5 is a perspective section of part of another pump according to the invention designed for pumping liquid upwards, FIGURE 6 is a part-sectional view of part of another pump according to the invention for pumping liquid, FIGURE 7 is a sectional view across AA of the pump shown in FIGURE 6, FIGURE 8 is a perspective view of a fluted conical surface within the pump shown in FIGURE 6, FIGURE 9 is a diagrammatic representation of any one of the four valves of the pneumatic drive system shown in FIGURE 11, FIGURE 10 is a perspective view of a mechanical drive system designed more particularly for use with any of the pumps shown in FIGURES 4, 5 and 6, FIGURE 11 is a perspective view of a pneumatic drive system designed more particularly for use with any of the pumps shown in FIGURES 1, 2 and 3, FIGURE 12 is a sectional side view of part of another pump according to the invention designed for pumping liquid downwards across high pressure gradients.

Referring now to the drawings, FIGURE 1 shows in side section part of the operative length of a pump for pumping liquids designed for a high rate of flow and having a cylindrical central channel 1 provided with tubular side passages inclined backwards with respect to the direction of flow of the liquid along the central channel. Such a pump is particularly suitable for the pumping of liquids at high Reynold's numbers. Both the channel and the side passages 2, 3 are filled with liquid 4 extending to a vertical cylinder, not shown, but to be later described (appearing as 82 in FIGURE 11), which cylinder is filled in the lower part with liquid and in the upper part with gas, the pressure of which gas is made to oscillate by external pumping means, also later described, thus causing the gas-liquid interface in the cylinder to rise and fall and liquid to flow in and out of the passages, and thereby to drive the pump. The advantage in employing oscillatory means of this kind in this and all further embodiments to be described is that more efficient coupling of momentum from the gas into the liquid is achieved than would be possible with say a continuous stream of gas which would result in bubbling of gas through the liquid and consequently small transfer of momentum from gas to liquid. The arrows indicate the lines of flow of the liquid when the passages 2 are on their blow strokes and the passages 3 are on their suck strokes. This pump and all further embodiments to be described are in particular directed to the pumping of molten-slag-seed mixture across pressure gradients of up to 10 atmospheres at temperatures between 1400° C. and 1800° C. in a combined heat exchanger and seed recoverer of magnetohydrodynamic generator plant.

FIGURE 2 shows in side section part of the operative length of a pump having a cylindrical central channel 5. The side passages in this embodiment comprise tubes 6 and 7 which project into the channel wall perpendicularly and pass to the centre where they are bent so that their jets 8 point along the axis of the channel in the direction of pumping. Both the channel and the tubes are filled with liquid extending to a vertical cylinder, not shown, but to be later described (and appearing as 82 in FIGURE 11) filled in the lower part with liquid and in the upper part with gas, the pressure of which gas is made to oscillate by external pumping means, also later described, thus causing the gas-liquid interface in the cylinder to rise and fall and liquid to flow in and out of the passages and thereby to drive the pump. These oscillations effect an approximately scalar influx of liquid 9 into any passage upon its suck stroke and a vector efflux out of the jet of any passage along the channel in the desired direction of pumping of the liquid upon the blow stroke of the passage. The arrows indicate the lines of flow of the liquid when the passage 6 is on its blow stroke and the passage 7 is on it suck stroke.

FIGURE 3 shows in side section part of the operative length of a pump wherein to achieve pumping across large pressure gradients the channel 10 is of the form of a series of venturi parts. Tubular passages 11, 12 of a suitable material project into the channel through the walls and pass to the centre where their jets 13 point along the axis of the channel in the desired direction of pumping. The tubular passages are enclosed in a sheath 14 for streamlining and to protect the material of the passages from erosion. Both the channel and the side passages are filled with liquid extending to a vertical cylinder, not shown, but to be later described (appearing as 82 in FIGURE 11) filled in the lower part with liquid and in the upper part with gas, the pressure of which is made to oscillate by external pumping means, also later described, thus causing the gas-liquid interfaces in the cylinder to rise and fall and liquid to flow in and out of the passages and thereby to drive the pump. These oscillations effect an approximately scalar influx of liquid into any passage upon its suck stroke and a vector efflux out of the jet of any passage and along the channel in the desired direction of pumping of the liquid upon the blow stroke of the passage. The arrows indicate the lines of flow of the liquid when the passage 11 is on its blow stroke and the passage 12 is on its suck stroke.

FIGURE 4 shows in perspective section part of the operative length of a pump for pumping liquids downward. The pump is constructed in cone shaped portions 16, 17, 18, 19, 20 which are fitted together one within the other to form the pump. The passages 21, 22, 23, 24 between the portions so fitted together are funnel-shaped and lead into the central channel 25 of the pump and their cones point in the desired direction of pumping. The passages contain partly liquid 26 and partly gas 27. The pressure of the gas 27 within each passage is made to oscillate by external pumping means later described so as to cause the gas-liquid interfaces 28 to oscillate within each passage. The arrows indicate the lines of flow of the liquid when the conical passages 22, 24 are on their blow strokes and the conical passages 21, 23, are on their suck strokes. This type of pump is particularly suitable for the pumping of liquids of high to low Reynold's numbers.

FIGURE 5 shows in perspective section part of the operative length of a pump for pumping liquids upwards. The pump is constructed in rotationally symmetrical W-section portions 29, 30, 31, 32, 33 which are fitted together one upon the other to form the pump. The passages 35, 36, 37, 38 between the portions so fixed together each has the form of an upwardly pointing cone with an axially symmetrical upwardly pointing U-bend in its surface. These passages open at an upwardly pointing angle into the central channel 39 up which liquid is desired to be pumped. Each passage contains partly liquid 40 and partly gas 41. The pressure of the gas 41 within each passage is made to oscillate by external pumping means later described so as to cause the gas-liquid interfaces 42 to oscillate within each passage. The arrows indicate the lines of flow of the liquid when the conical passages 35, 37 are on their blow strokes and the conical passages 36, 38 are on their suck strokes.

FIGURE 6 shows in part section and in part raised elevation part of the operative length of a pump for pumping a liquid downwards. The pump is constructed in cone shaped portions 43, 44, 45, 46 fitted one upon another to form the whole pump. The passages 47, 48, 49 therebetween the portions so fitted together are funnel shaped and lead into the central channel 50 of the pump and their cones point in the desired direction of pumping. The interior surfaces 51, 52, 53, 54, 55, 56 of the passages are ridged spirally and for clarity 51 is shown in raised elevation and is further shown in FIGURE 8. The spiralling of surface 54 shown chain-doted is intended to illustrate the spiralling at the front of this conical surface. The spiralling of adjacent passages is indicated to be in the opposite sense to one another as is preferred. Each passage contains partly liquid 57 and partly gas 58. The pressure of the gas 58 within each passage is made to oscillate by external pumping means, later described, so as to cause the gas-liquid interfaces 59 to oscillate within each passage. By virtue of the spiralling a vortex motion of the liquid is created within the passage upon a blow stroke so that the liquid upon ejection is by centrifugal force flung outwards and down the channel in the desired direction of pumping rather than back upwards. The arrows indicate the lines of flow of the liquid when the conical passages 47, 49 are on their blow strokes and the conical passage 48 is on its suck stroke.

FIGURE 7 is a sectional view across AA of the embodiment shown in FIGURE 6 and in which sectional view kinks 60, 61, 62, 63, etc. in the passage 48 and kinks 64, 65, 66, etc. in the passage 47 are clearly shown. The arrows indicate the senses of swirl of the liquid in the passages 47, 48 if the spiralling of the walls of adjacent passages in FIGURE 6 are in the opposite sense of rotation (looking in the direction of pumping) and when passage 48 is on its suck stroke and passage 47 is on its blow stroke.

FIGURE 8 shows a perspective view of the fluted inner conical surface 54 within the embodiment shown in FIGURE 6 and also to some extent the fluted conical surface 51 and the central channel 50. It can be clearly seen from FIGURE 8 that the spiralling of conical surfaces 51 and 54 in FIGURES 6, 7, 8 is in the opposite sense as is preferred.

Figure 12:
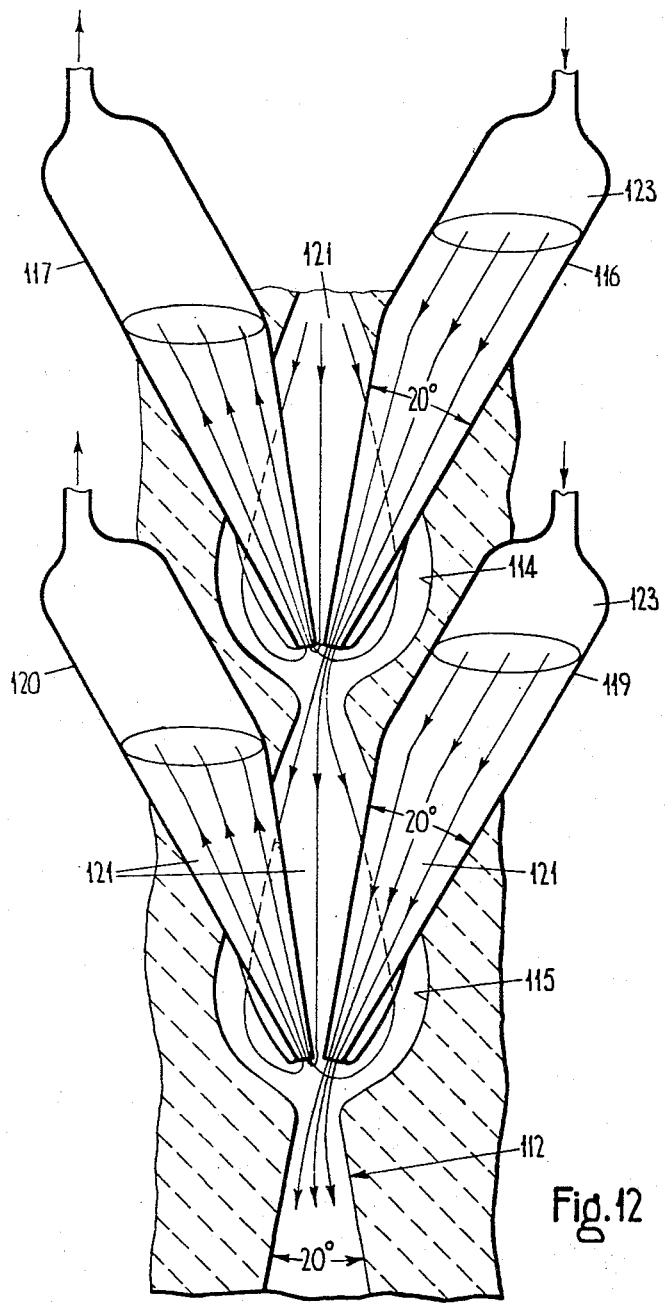

FIGURE 12 shows in side-section part of the operative length of a pump of suitable refractory material wherein to achieve the pumping of high temperature liquid slag-seed mixture downwards across high pressure gradients in M.H.D. generator plant the channel 112 is vertical and comprises a series of venturi-parts, such as 114 and 115, connected end-to-end. Pairs of tubular passages such as 116, 117 and 119, 120 project downwardly into the venturi, one pair into each venturi, respectively 114 and 115 in these latter cases, and with each passage inclined at an angle of approximately 10° to the axis of the channel. The tubular passages are tapered substantially towards their nozzles and at an angle of 10° to their respective central axes. The end-edges of the nozzles of each pair of passages are rounded to effect a smoother flow of liquid into and out of their apertures than would otherwise be obtained and the nozzles are positioned just upstream of their respective adjacent venturi restrictions. The passages contain partly liquid 121 and partly gas 123. In use the pressure of the gas 123 is made to oscillate in each passage tube by external pumping means to be later described. These oscillations are so phased in the various passage tubes as to be exactly in phase in the passages such as 116 and 119 on one side of the central channel and exactly 180° out of phase with those such as 117 and 120 on the opposite side of the channel. The pumping means used and to be later described is arranged in this embodiment to cause the gas-liquid interfaces in the passages to oscillate wholly within the purely cylindrical portions of these passages. The arrows indicate the lines of flow of the liquid when the tubular passages 116, 119 are on the early part of their blow strokes and the tubular passages 117, 120 are on the early part of their suck strokes.

In any of the embodiments shown in FIGURES 1-8 or in FIGURE 12 the material employed for the walls of the channel and the passages or lining thereof may suitably be low porosity magnesium oxide, zirconium oxide or thorium oxide or other refractory material inert to the liquid being pumped.

FIGURE 9 is a diagrammatic representation of one of the valves of the pneumatic drive means of FIGURE 11 designed for use with any of the pumps shown in FIGURES 1, 2, 3 and 12. Such a pneumatic drive means is shown in perspective in FIGURE 11. FIGURE 9 shows a single valve which controls the suck and blow strokes in a single passage of any of the pumps. In FIGURE 9 a hollow metal cylinder 67 is turnable about its axis and is situated within a metallic casing 68 having diametrically opposite outlet chambers 69, 70 formed in its walls each outlet chamber leading by way of flexible tubing 71, 72 respectively through controllable subsidiary valves V to low and high gas pressure reservoirs 73, 74 respectively (the gas being, of course, a non-corrosive one). The central hollow cylinder 67 has slotted ports 75, 76 cut in its walls and situated at 90° apart from each other. These slotted ports 75, 76 are very much narrower than the chambers 69, 70. Up into the bottom of the metallic casing 68 at a level lower than the extent of the hollow metal cylinder 67 there protrudes a pipe 77 leading to one of the pump passages via the cylinder 82 in FIGURE 11.

In operation of the valve, cylinder 67 is oscillated through an angle of about 90° so that ports 75, 76 are alternately open to their respective chambers 70, 69 and for a small fraction of the time neither is open. During the time that port 75 is adjacent to the chamber 70, gas will rush into the interior 78 of the metal cylinder 67 and then downwards into the lower part of the metal casing 68, into the pipe 77 and so to the gas-liquid interface for the passage being pumped and so producing a blow stroke in this arm. Likewise during the time that port 76 is adjacent the chamber 69 gas will be drawn out of the interior 78 of the metal cylinder 67 and sucked upwards from the lower part of the casing 68, sucked out of pipe 77 so causing a suck stroke in the passage being pumped. During the times that neither of the ports 75, 76 is open the interior of cylinder 67 and the lower part of the casing 68 will be cut off from both of the gas pressure reservoirs 73, 74. This period should preferably be made as brief as possible.

The metallic casing 68 is made to some extent angularly adjustable for the purpose of controlling the relative timings of the suck and blow strokes. The pointer 79 is indicative of the angular setting of the metal casing 68 and is shown in FIGURE 9 as it would be for suck and blow strokes of equal duration. The casing 68 could be set such that pointer 79 is anywhere between A and B however. With pointer 79 close to the extreme position A there would be very short blow strokes but full suck strokes and vice versa when point 79 is closed to extreme position B. This facility may be used in a system to servo-control the liquid heights in the pump passages in for example a pump for pumping liquids downwards.

FIGURE 11 is a perspective view of the pneumatic drive means, one valve of which is shown diagrammatically in FIGURE 9. In FIGURE 11 four such valves C, D, E, F of a pneumatic drive means are shown operated by a single drive 80 which rotates continuously but yet causes each of the valve arms 81 and therefore the valve interior cylinders 67 adjoined merely to oscillate continuously through approximately 90° as required. Each valve is connected by way of pipe 77 to its own pump passage via its own intermediary cylinder 82 containing partly gas 83 and partly liquid 84. This avoids both the risk of blowing gas into the central channel in the event of an over-blow and the danger of sucking back corrosive liquid into the drive means in the event of an over-suck or of the evolution of a blockage in the central channel. In the case of embodiments 4, 5, 6 the tube 77 will be connected direct to the passages of the pump.

FIGURE 10 is a perspective view of a mechanical drive means alternative and preferred to the pneumatic drive means last described. In FIGURE 10 a cam shaft 85 carrying cams 86, 87, 88, 89 drives push rods 90, 91, 92, 93 which drive levers 94, 95, 96, 97 pivoted about a variable stroke pivot 98 passing through slots 99 and which levers, connected at their further ends, drive further push rods 100, 101, 102, 103 and which further push rods each drives its own plunger such as 104 in its own blow-suck cylinder 105, partially filled with non-corrosive gas 106 and leading via conduit 107 to the passage in question controlled to create the necessary pumping pulsations therein. The push rods 90, 91 92, 93 after being forced away from the cams by their action are later returned to their original positions by the action of the return springs 108 so that each push rod lever, further push rod and plunger oscillates causing oscillations in the passages of the pump. The phasing of the oscillations in the various passages is governed by the relative settings of the cams 86, 87, 88, 89 and these are made such that the required phasing of the pulsations in the passages of the pump are obtained. The amplitude of the pulsations in all four pump passages may be suitably increased by raising, or decreased by lowering, the variable stroke pivot 98 in the slots 99. The camshaft may suitably be driven by an electric motor 109 through a variable speed gearbox 110 and a reduction gearbox 111.

The drive means of FIGURES 9 and 11 could also be used with the embodiments shown in FIGURES 4, 5, 6 by connecting the pump passages of the latter to the cylinders 82 and allowing these passages and connecting means to be filled with the liquid being pumped. Alternatively the drive means of FIGURES 9 and 11 could be modified for this purpose by omitting the cylinders 82 and connecting the pipes 77 each to the corresponding pump passage for the transmission of the gas pressure variations thereto.

Similarly the drive means of FIGURE 10, which is preferred, could be used with the embodiments shown in FIGURES 1, 2, 3 and 12 by connecting the pipes 107 to a vertical cylinder, similar to 82 in FIGURE 11, which is partially filled with liquid and connected to the pump passages through liquid-filled pipes, as in the FIGURE 11 arrangement.

The mechanical drive means of FIGURE 10 could be coupled hydraulically to a hot liquid pump through a series of immiscible non-reactive liquids, with appropriate graded melting and boiling points, across which the temperature is progressively lowered to a value suitable for a solid moving piston.

For pumping liquids two other possible means of driving pumps similar to those shown in and described with reference to any one of FIGURES 4, 5, 6, 12 may be employed. Both of these involve the modification that the upper ends of the various passages be closed and incorporate the provision of injectors and/or valves in the upper parts of the passages. Both of them too, in operation, utilize thermal expansion of a gas or vapour in the upper parts of the passages to provide the driving forces on the liquid interfaces in the passages during blow strokes, so that the closed ends of the passages in effect provide chambers of the nature of internal combustion chambers or thermal expansion chambers, in which the pump liquid in the passage acts in effect as a piston, both operating on 2-stroke cycles, for which the drive and exhaust stages will hereafter be referred to as the blow and suck strokes.

Thus one such means, applicable to the pumping of both hot and cold liquids, employs the provision of a fuel injector and inlet and exhaust valves at the top of each passage. In operation, immediately prior to a blow stroke in each passage, when the liquid interface is at its highest level in the passage the inlet valve is opened and a burst of compressed air is blown in. Immediately following this combustible liquid fuel such as paraffin is injected as a spray, the inlet valve is closed and the fuel-air mixture is ignited and expands, either by spark ignition from a sparking plug provided near the top of the passage and arranged to spark at that moment or, in the case of a high-temperature liquid being pumped, by ignition at the high-temperature liquid interface. This expansion by combustion forces the liquid interface down the passage, thus providing the blow stroke. At the termination of the blow stroke the exhaust valve is opened to an external region maintained at some suitable pressure less than that prevailing in the liquid in the central channel whereupon the high pressure prevailing in the central channel forces the liquid interface upwards, almost to the top of the passage. This constitutes the suck stroke and almost empties the passage of burnt gases. The exhaust valve is then closed thus checking the rise and completing the suck stroke. This procedure is then repeated continuously in each passage, the required phasing of the pulsations in the passages being obtained by a suitable time sequence of operation of the valves and air/fuel injection stages for the passages.

The other drive means aforesaid is applicable only to the pumping of hot liquids, such for example as molten seed-slag mixture at over 1000° C. in M.H.D. generator plant or such as molten metal and employs the provision of an exhaust valve at the top of each passage and an injector for a non-combustible vapourisable drive liquid (e.g., water) let into the side of the passage. In operation, immediately prior to a blow stroke in each passage, when the pump liquid interface is at its highest level in the passage, with the exhaust valve closed and with the level of the interface of the hot pump liquid in the passage above the injector, a quantity of drive liquid is injected from the injector into the hot pump liquid. The injected drive liquid is almost immediately turned into bubbles of pressurised vapour. These rise rapidly through the hot pump liquid to the top of the passage, continuing to heat up and expanding in transit and an expansion takes place which forces the pump liquid interface down the passage, thus providing the blow stroke. When the pump liquid interface is at its lowermost desired level in the passage the blow stroke is terminated by opening the exhaust valve at the top of the passage to an external region maintained at some suitable pressure less than that pevailing in the pump liquid in the central channel. The high pressure prevailing in the hot pump liquid in the central channel then forces the hot pump liquid interface in the passage upwards almost to the top of the passage and clears the passage of spent drive vapour. The exhaust valve is then caused to close to check this rise and to complete the suck stroke. This procedure is then continuously repeated in each passage during the operation of the pump with suitable phasing of the strokes in the different passages.

In either of the two last described forms of driving means, in the phasing of the blow strokes in the various passages relative to one another various degrees of coupling between blow and suck strokes in different passages may be made in accordance with the patterns of liquid flows developed. Thus the blow stroke in one passage may be arranged to help the suck stroke in another and so that when 180° of cycle have elapsed the help may be reversed. This may result in faster suck strokes in each passage and a faster rate of pumping of the liquid along the central channel than would otherwise be obtained.

The pumps shown in FIGURES 1, 2, 3 and 12 may be used for pumping gases as well as liquids; thus corrosive gas could be pumped by means of a liquid/gas piston in reverse. For example, for each pump passage a mechanical piston such as 105 may be arranged to drive a liquid into and out of the bottom of a cylinder similar to 82 to the top of which cylinder the pump passage is connected. Very hot (but non-corrosive) gases may alternatively be pumped by a direct connection from a drive cylinder pipe such as 107 to a pump passage such as 11 in such a way that there is a temperature gradient along the connecting pipe.

It will be appreciated that any embodiment of the invention as described may contain any suitable number of pump passages similar to those illustrated, according to the pumping action required.

We claim:

1. A pump for fluid comprising a channel from which there project a plurality of passages spaced in succession along the length of the channel, the channel extending from a first region to a second region and the passages being connected to means entirely external of said channel for effecting pulsations of fluid along the passages when, in use of the pump, the channel is filled with fluid which extends into the passages, said pulsations being effected by the exertion of fluid pressure upon said fluid which extends into said passages, said means being arranged to so phase the pulsations between the various passages, and the passage inlets being so directed along the length of the channel, as to induce a net forward flow of fluid along the channel from said first to said second region when these regions are respectively at low and high pressures.

2. A pump according to claim 1, wherein the pulsations of fluid along the passages are produced by pressure variations in a gas linkage driven by external drive means.

3. A pump according to claim 1, wherein the pulsations of fluid along the passages are produced by pulsations of a liquid in a liquid linkage driven by external drive means.

4. A pump according to claim 1, wherein the passages and their entries into the channel are so oriented and shaped relative to the shape and direction of the channel that there is a net forward flow of fluid induced along the channel during both the suck and the blow strokes of the pulsations in any passage.

5. A pump according to claim 1, wherein the channel is of approximately cylindrical shape and the passages are in the form of tubes extending from the walls of the channel and inclined backwards with respect to the direction of flow of the fluid along the channel.

6. A pump according to claim 1, wherein the channel is of the form of a series of venturi parts and the passages extend as tubes through the falls to the center of the channel and within the channel are bent in such a way that their nozzles point along the axis of the channel in the desired direction of flow of fluid along the channel.

7. A pump according to claim 6 for pumping liquids downwards, wherein the said channel is vertical, each venturi wall in the diverging portion of its venturi diverges at a small angle to the axis of the channel and wherein a pair of passage tubes, each tube being cylindrical in its upper part but being tapered towards its nozzle at a small angle to its own axis, projects, each tube from opposite sides, through the walls of the channel into the region adjacent to and upstream of each of the venturi restrictions, and which pump is arranged to be operated with the pulsations in the passage tubes on one side of the channel approximately in phase with one another and approximately 180° out of phase with the pulsations in the passage tubes on the opposite side of the channel, the pressure responsive medium-liquid interfaces in each passage tube being arranged to oscillate substantially within the wholly cylindrical portion of it.

8. A pump according to claim 1, wherein the channel is vertical and each passage of said channel is approximately funnel-shaped, the aperture of each passage where it joins the channel extending round the circumference of the channel.

9. A pump according to claim 8 for pumping liquids downwards, wherein the passage funnels point downwards and the surfaces of each funnel passage are ridged internally in spirals about the axis of the central channel in such manner as to cause the liquid in each passage on a blow stroke to swirl into a vortex motion within the passage, and thereby upon ejection into the channel by virtue of the centrifugal force acquired, to be flung outwards and down the channel rather than upwards.

10. A pump according to claim 8 for pumping liquids upwards, wherein each of said passages has approximately the shape of an upwardly pointing funnel bent back upwardly upon itself to provide a bend at the bottom communicating between downward and upward funnel passage portions and wherein said drive means is adapted to effect pulsations in which the pressure responsive medium-fluid interfaces oscillate wholly within the downward portions of the passages so that no pressure responsive medium is blown out into the central channel and so lost.

11. A pump according to claim 10, wherein the surfaces of each funnel passage are ridged internally in spirals about the axis of the central channel in such manner as to cause the liquid in each passage on a blow stroke to swirl into a vortex motion within the passage, and thereby upon ejection into the channel to be flung outwards and up the channel rather than downwards.

12. A pump according to claim 9, wherein said spirals in each funnel passage are in the opposite clockwise sense to those in the passages immediately above and below it, thereby promoting by angular momentum coupling more efficient transfer of liquid out of any one passage upon a blow stroke and into the next in the desired direction of pumping.

13. A pump according to claim 8 for pumping liquids, wherein the axis of each passage portion adjacent to the central channel is inclined acutely to the axis of the central channel in the direction of pumping and the edge of the nozzle therebetween these two directions is sharp so that on a suck stroke the non-reciprocity of flow of a liquid forced around a sharp bend is utilized, liquid drawn into any passage being effectively lodge there until blown-out upon the coming of the next blow stroke.

14. A pump according to claim 1 adapted for the pumping of hot molten slag-seed mixture in a combined heat exchanger and seed recoverer of M.H.D. generator plant and wherein the material of the walls of the channel and the passages is a suitable refractory substantially inert to the liquid being pumped.

15. A pump according to claim 1 designed for pumping liquids and in which the ends of the passages are closed, provided with inlet and exhaust valves or injectors, and associated with means for introducing drive fuel or vapourisable liquid so that the ends of the passages provide internal combustion chambers or thermal expansion chambers in which the pump liquid acts in effect as a piston arranged to be driven by the ignition of said fuel or expansion of said vapourisable liquid.

16. A pump according to claim 11, wherein said spirals in each funnel passage are in the opposite clockwise sense to those in the passages immediately above and below it, thereby promoting by angular momentum coupling more efficient transfer of liquid out of any one passage upon a blow stroke and into the next in the desired direction of pumping.

References Cited
UNITED STATES PATENTS

| | | | |
|---|---|---|---|
| 1,257,004 | 2/1918 | Humphrey | 230—70 |
| 2,111,682 | 3/1938 | Uesugi | 103—1 |
| 2,435,548 | 2/1948 | Rosenthal | 230—1 |
| 2,553,543 | 5/1951 | Bodine | 103—1 X |
| 2,765,975 | 10/1956 | Lindenblad | 230—1 X |

DONLEY J. STOCKING, *Primary Examiner.*

W. J. KRAUSS, *Assistant Examiner.*